Nov. 23, 1926.  1,607,667
E. E. ESSEN
VALVE SPRING COMPRESSOR
Filed Feb. 8, 1923

Inventor
Eric E. Essen

Patented Nov. 23, 1926.

1,607,667

UNITED STATES PATENT OFFICE.

ERIC E. ESSEN, OF BROOKLYN, NEW YORK.

VALVE-SPRING COMPRESSOR.

Application filed February 8, 1923. Serial No. 617,861.

This invention relates to valve spring compressors, and more particularly to the class wherein a bracket is bifurcated at its lower extremity and is provided in its upper extremity with a vertical rack passing therethrough and a pinion therein engaging the rack, with a handle on one side whereby to rotate the pinion and on the other side a friction cap to control said pinion in movement.

The main object of my invention is to provide a valve spring compressor which is adapted for all sizes of motors and valves, and which is both easy to operate and positive in action.

Other objects and attained advantages will appear as this specification proceeds.

Figure 1:
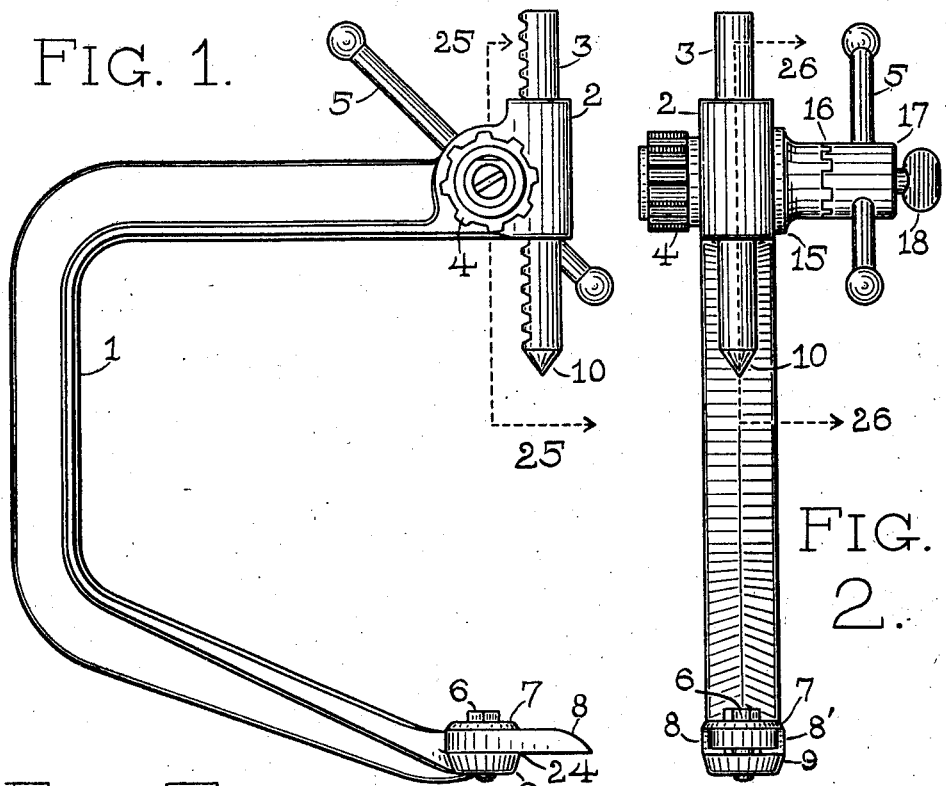
Fig. 1 is a view of a valve spring tool made in accordance with my invention.
Figure 2:
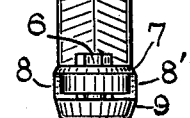
Fig. 2 is another view of the same.
Figure 5:
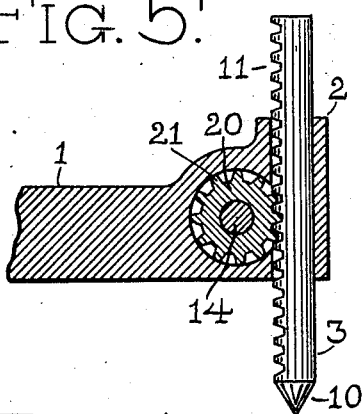
Fig. 5 is a fragmentary section of Fig. 2 on line 26—26, the handle having been omitted from the background to clear the view.

In the practice of my invention, a bracket 1 is furnished with a hollow head 2 through which a vertical rack 3 is adapted to slide. The lower extremity 10 of the rack is pointed to engage the center hole of of a valve, as the large extremities of the latter are invariably furnished with center holes for regrinding and provide an excellent means for accurately placing the present tool upon the valve.

A pinion shaft 20 passes transversely through the bracket head and engages the teeth 11 of the rack with its pinion portion 21, the teeth of the latter being cut directly into the shaft. On one extremity of the pinion shaft is a flange 15 adapted to engage the side of the bracket head and determine the location of the pinion axially, while on the other extremity is a threaded portion 22 and a flat section 23. On this extremity but just within the thread is mounted a fiber or other suitable washer 19 bearing directly against the right side of the head 2, while outside of the same is mounted a metal washer 12 which fits the flat portion 23 of the shaft, and will therefore turn with the shaft. An adjustment cup or cap 4 is screwed on the threaded portion and is adapted to clamp the fiber washer between the head and washer 12, and as the latter does not rotate with the cup but with the shaft, as mentioned, the resulting friction will constitute a controlling and braking means upon the rotation of the pinion.

The pinion shaft, however, is hollow in order to house one extremity of a center shaft 14 which is slidable therein and retained by a screw 13. A spring 34 is mounted under the head of the screw, upon the shaft, and bears against the inner end of the pocket 35 of the pinion shaft, tending to draw the center shaft into the pinion shaft. But the outer extremity of the center shaft is secured in a handle head 17 in which a handle 5 is secured by a thumb screw 18. The handle may thus be shifted up or down and secured in any attained position. Of course, it may also be permanently secured in a certain position if so desired.

Figure 3:
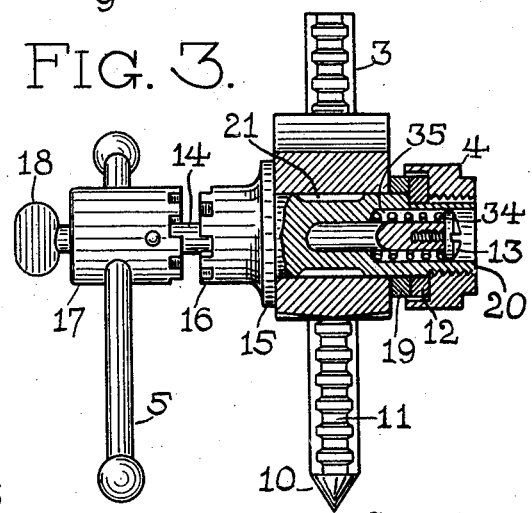
Fig. 3 is a section of Fig. 1 on line 31—31.
Figure 4:
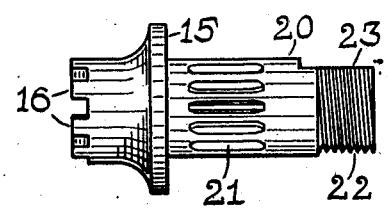
Fig. 4 is a side view of the pinion of the previous views as embodied in the main spindle.

But in order to enhance the adaptability of the tool in awkward places, the handle head and pinion shaft have been provided with mutually engageable teeth 16 which normally convey any movement of the handle to the pinion, whereby the rack may be raised or lowered. If the handle head is drawn out sufficiently to clear the teeth, as in Fig. 3, the handle may be rotated while the pinion shaft is stationary and then allowed to spring back into a new engagement with the same. The center shaft thus merely acts as a pivot and anchoring means for the handle head, while the teeth of the latter transmit the desired movements of the handle to the pinion without straining the centering shaft. As has been already mentioned, the handle thus moves the rack up or down, according to the counter clock-wise or clock-wise movement of the pinion caused thereby, while a slight turn on the friction or adjustment cup in one direction will advance it on the pinion shaft thread against the washer between the cup and the bracket and thus lock the pinion, or in the opposite direction will partially or completely release the pinion as desired. The action is really caused by the fiber washer remaining stationary by virtue of its frictional contact with the head 2 of the bracket, while the other washer acts as the brake plate against said fiber washer. Occasionally, the fiber washer may follow the other washer in rotation and then the friction between the same and the bracket will still result in a braking action. However, the theory is that the washer which rotates with the shaft is the brake plate proper and the other washer or disk remains stationary to provide the frictional resistance required. Hence, instead of but two disks being used, several could be employed without departing from the spirit of my invention.

If we now turn to the lower part of the bracket, the fork 8—8' is secured upon the extremity 9 at 24 by a cap 7 and a screw 6 which passes through both. The prongs 8 and 8' are adapted to pass on either side of a valve stem in order to engage a spring and washer in known manner; but as this is no part of the invention further illustration of the use of the parts is superfluous, being common and well understood.

Having now fully described my invention, I claim:—

1. The combination in a valve-spring compressor, of a frame having a lower bifurcated portion and an opposite upper portion, a slidable rack housed in said upper frame portion adapted to project toward said lower portion, and a transverse spindle also mounted in said upper frame portion in engagement with said rack, with a friction disk mounted on said spindle, means to clamp said disk against said frame and means to rotate said spindle comprising a handle, all said means being adapted to permit an impeded rotation of said spindle and thereby a controlled sliding movement of said rack when sufficient force is applied to said handle.

2. A valve-spring compressor having a frame, a bifurcated lower extremity and an opposite upper extremity housing a slidable rack, a transverse spindle provided with a pinion engaging said rack and mounted in said upper extremity, a friction disk mounted on said spindle, means to clamp said disk and thereby brake movement of said spindle in rotation, a handle on said spindle for manipulation of the same, and means to change the relation of said handle to said spindle.

3. A valve-spring compressor including a bracket having a bifurcated lower portion and an opposite upper portion with a slidable rack mounted therein, a transverse spindle also mounted therein and provided with a pinion in mesh with said rack, means to rotate said spindle and means to brake such movement including a thread upon said spindle, and a friction disk mounted on the spindle, and a manually rotatable screw-cap on said thread whereby to clamp said disk against said upper bracket portion in various degrees of pressure.

4. A valve-spring compressor having a bracket provided with a pair of opposite extremities, and a slidable rack mounted in the upper of the pair, a spindle in said upper extremity having a pinion in mesh with said rack and means to rotate the same, means to brake movement of said spindle and pinion comprising a friction disk and a second disk mounted on the spindle, a thread on the spindle, a screw-cap on said thread adapted to contact with and clamp said disks, means to prevent rotation of said second disk with said screw-cap and ensure rotation thereof with said spindle including a slot on said spindle, and a tongue upon said disk adapted to project into said slot.

5. A valve-spring compressor comprising a bracket having an upper and an opposite lower portion, a rack slidably mounted in said upper portion, a spindle mounted in said upper portion and provided with a pinion in mesh with said rack, means to rotate said spindle including a handle, means to change the relation of said handle to said spindle including a second spindle projecting into said first spindle and provided with a toothed clutch portion, a second corresponding clutch portion on said first spindle, a mounting on said second spindle for said handle, and a spring mounted on the inner extremity of said second spindle within said first spindle tending to retain said spindle clutch portions in engagement but permitting axial projection of said second spindle from said first spindle to clear said clutch portions at will.

6. The combination in a valve-spring compressor, of a frame having an upper extremity and an opposite lower extremity, a slidably disposed rack mounted in said upper frame extremity, and a spindle provided with a pinion in mesh with said rack, there being a handle on said spindle, with a friction brake mounted on said spindle, and adjustment means for said brake adapting said spindle to be partially impeded in rotation in loose adjustment of said brake and to be locked rigidly in position in close adjustment of the said brake.

In testimony whereof I have affixed my signature.

ERIC E. ESSEN.